April 29, 1924.

V. M. CABRETOSA

ELASTIC WHEEL

Filed Dec. 4, 1922

Inventor
V. M. Cabretosa
by Langner, Parry, Card & Langner
Att'ys.

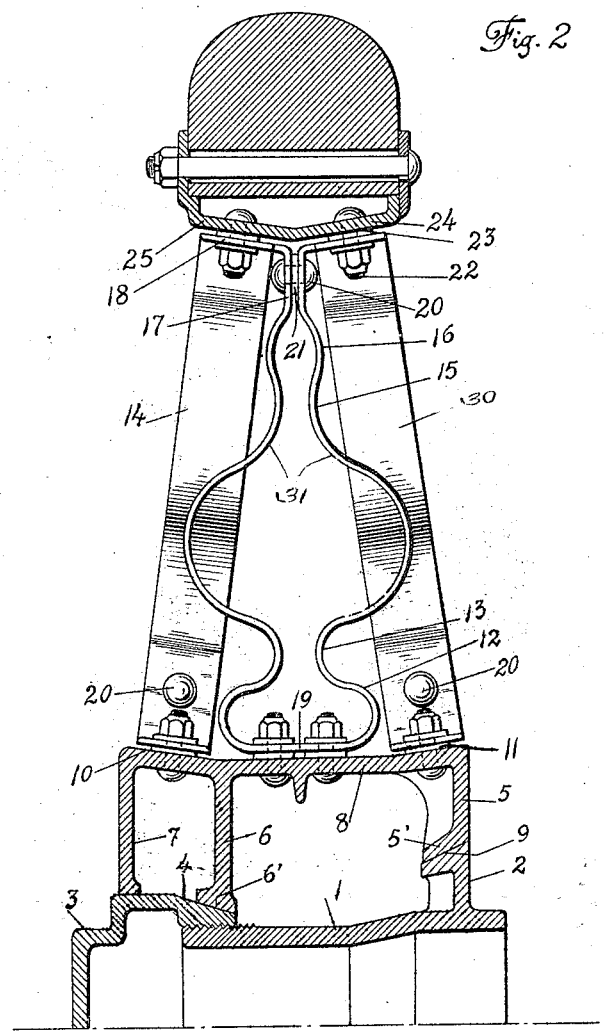

Patented Apr. 29, 1924.

1,492,068

UNITED STATES PATENT OFFICE.

VALENTIN MARTI CABRETOSA, OF BARCELONA, SPAIN.

ELASTIC WHEEL.

Application filed December 4, 1922. Serial No. 604,881.

*To all whom it may concern:*

Be it known that I, VALENTIN MARTI CABRETOSA, subject of the King of Spain, residing at Barcelona, Spain, have invented certain new and useful Improvements in Elastic Wheels, of which the following is a specification.

This invention relates to elastic wheels the spokes of which are constituted by springs formed of curved laminas. In this kind of wheels, arrangements are already known of springs in two groups, the springs of one group being located in planes passing through the axis of the wheel, while the springs of the other group are located in planes transverse to the axis of the wheel.

According to this invention the springs located in planes transverse to the axle are arranged in pairs, the two springs of each pair being opposite one another at the two sides of the wheel and converging from the hub to the rim. The springs are made of curved elastic strap and each of the springs has two branches, which extend forming different curves and with more pronounced curvature towards one end of the spring than towards the other. These double springs are arranged in such a manner that the springs, located in axial planes of the wheel, have the curvature of their branches of lesser radius nearer the hub than the rim, and the springs of the other group their curvature of lesser radius nearer the rim. This positions the sharper curves of the springs which are in the axial planes, nearer the hub, and the sharper curves of the springs of the other group, nearer the rim. By this means the most complete utility of the available space is obtained, for the purpose of placing springs therein. Further, the very important advantage is obtained that the springs of the groups of springs which are alternately parallel with, and transverse to, the axle of the wheel, will, when the wheel is submitted to an excessively strong force, contact at their broad curves, which generally have a free space between them, and they will then be in such contact with each other, that the wheel is made almost rigid, and the risk of breakage is avoided.

In order to prevent ruptures, the special arrangement of the union of the springs with the hub and rim and of the two branches of each spring with each other is of great importance. According to this invention, this union is effectuated by means of special washers that maintain the parts of the respective springs at a determinate distance from each other, and from the portion of the wheel to which they are jointed. As a further advantage in regard to the form and special disposition of the double springs, it should be kept in mind that these springs have exactly the same shape for both groups, whereby their construction and upkeep is greatly facilitated and cheapened.

The exterior surface of the hub is formed to serve as a support for the transverse and longitudinal springs. In a like manner the interior face of the rim is formed to receive the terminal flanges of the transverse springs and the central bedding of the longitudinal springs.

In the annexed drawing an example of a preferred construction of a carriage-wheel is shown in accordance with the invention.

Fig. 2 is a vertical section on line II of Fig. 1.

Figure 1:
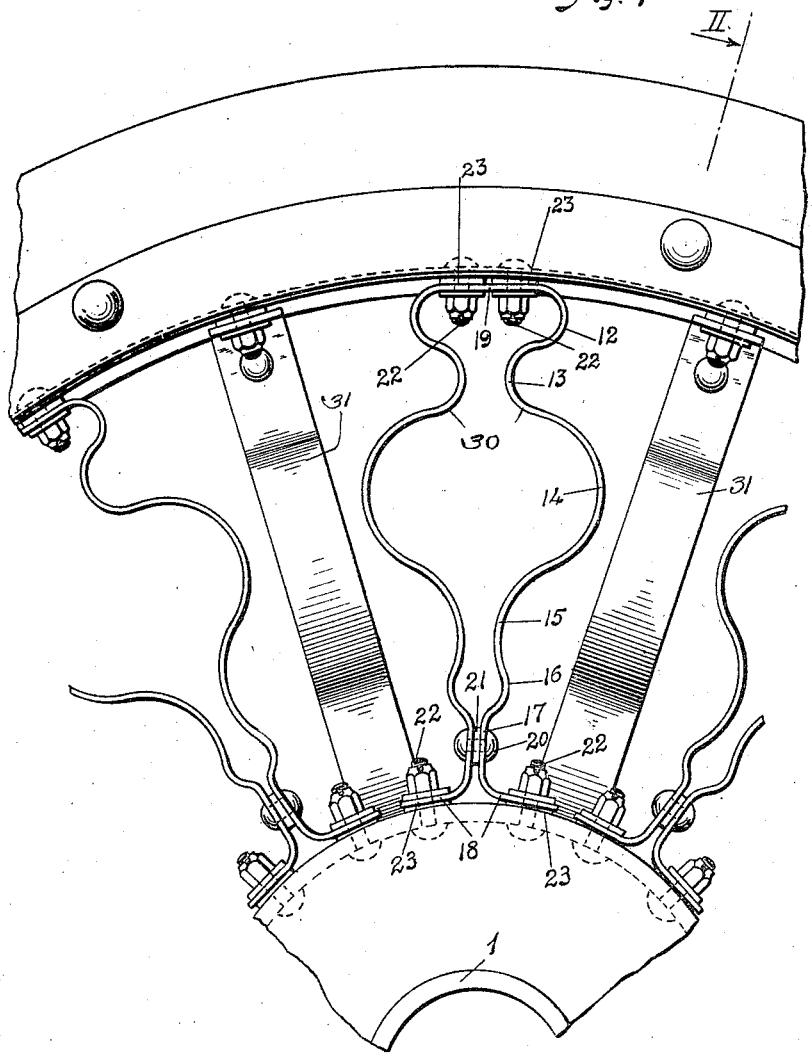
Fig. 1 is an elevation of a sector of the wheel.

The wheel is applied to the collar or muff —1— which at its outer part carries the cover —3— screwed thereon, while the inner end is furnished with an annular or ring-shaped prolongation —2— in the shape of a flange. The hub —5—6—7—8— which forms the bedding of the springs, rests with its front wall —7— and the rib —6— on cover —3—, and by means of the other wall —5—, on the flange of the prolongation —2— of collar —1—. For the sake of accurate fit and adjustment, the walls —6— and —5— terminate in conical surfaces —6'— and —5'— which correspond to the surfaces —4— and —9— of the cover —3— and the collar —1— respectively. The hub —5—6—7—8— presents at both ends conical surfaces —10— and —11— for the bedding of the longitudinal springs, and in the central part the cylindrical surface —8— for the bedding of the transverse springs.

The springs which replace the usual spokes of the wheel, are constituted by a metallic strap or tape which presents in the center a level or flat part —19— in order to form the bedding of the springs. From part —19— the two branches of the metallic strap are curved symmetrically towards each other forming the curve —12— with the subsequent throat —13—. Then the two branches separate forming part —14— of large interior radius, and immediately after they approach each other again, being curved or undulated in —15—, and forming finally the sinus —16— of reduced dimension. From part —16— the two branches continue parallel to each other, forming part —17— and the ends —18— are bent forming flanges for fixing the spring. At the part —17— the two branches of each spring are joined together by the rivet —20— with an interposed washer —21— which serves to isolate the branches from contact with each other. Each spring is fixed to the hub and the rim by means of screws —22— with interposed washers —23—.

While I consider it preferable to make each spring of one single strap bent in order to form the two branches of the spring, it is also possible to make the two branches of the spring independently and afterwards join them together by rivets or otherwise.

As can be seen in Figs. 1 and 2, a transverse spring —31— is combined alternately with two longitudinal springs —30— at each side, the transverse springs —31— extending with their shafts in the manner of the usual wheel-spokes, whereas the longitudinal springs —30— are inclined and converge relative to each other towards the rim. At the same time, the longitudinal springs —30— have a reversed position relative to the transverse springs —31—, i. e., the base —19— of the longitudinal springs rests on the rim while the base —19— of the transverse springs rests on the hub. The springs are shaped to combine in such a manner that the width or straddle —14— of the transverse springs —31— corresponds to the neck —15— of the longitudinal springs —30—, in order that, in the case of an abnormal flattening of the wheel, the springs will rest on one another by the body contact of their larger bared portions 14 and constitute a rigid whole.

The rim has the inclined surfaces —24— and —25—, the slant of which is such as to enable the bases of the longitudinal springs —30— to rest on them, leaving the rim in an outwardly inclined position (Fig. 2). A result of constructing the elastic wheel in accordance with the drawing and specification, is, that all the forces which the wheel receives, are transmitted to the springs —30— and —31— which withstand not only radial forces, but also transverse forces, the latter being compensated by the arrangement and inclination of the longitudinal springs —30—. The shape and arrangement of the springs represented in the drawing, produce exceedingly resistent wheels of very great elasticity.

I claim:

1. An elastic wheel having, in combination, a hub, a rim, a series of two branch springs made of elastic curved members and located in planes passing through the axis of the wheel, and a series of similar springs arranged opposite one another in pairs, and located in planes transverse to the axis of the wheel, the springs of each pair converging relative to each other from the hub to the rim, the branches of all of said springs being formed in several unequal curves, the largest of which is nearer the hub in the springs placed in axial planes, and nearer the rim in the springs placed in the transverse planes.

2. An elastic wheel comprising a hub, a rim, spokes uniting the hub with the rim and each formed of spring of two branches forming an open ended loop, and made of elastic curved blades formed in several unequal curves, some of said spokes being situated in axial planes of the wheel and fixed at the closed ends of their loops to the hub of the wheel, and at the open ends of their loops to the rim, the remainder of the spokes being arranged in pairs, and situated in planes transverse to the axis of the wheel, the spokes of each pair converging relative to each other from the hub towards the rim and each member of a pair being fixed at the closed end of its loop, to the hub, the pairs of spokes and the axial spokes being positioned alternately around the wheel.

3. An elastic wheel comprising a hub, a rim, spokes uniting the hub to the rim, each spoke being formed of an elastic curved blade having two symmetrical branches forming several unequal curves, said spokes being fixed to the hub and to the rim, and being divided into two groups, the spokes of one group being situated in axial planes of the wheel, and the spokes of the other group being arranged in pairs, and situated in planes transverse to the axis of the wheel, the spokes of each pair converging relative to each other from the hub towards the rim.

4. An elastic wheel comprising a hub, a rim, and a plurality of looped spokes connecting the hub and the rim, some of the spokes being positioned with the plane of their loop in axial planes of the wheel, and the remaining spokes, being arranged in opposing pairs, and positioned with the planes of their loops in planes substantially transverse to the axis of the wheel.

5. A wheel according to claim 4, the spokes that are arranged in pairs, converging relative to each other toward the rim, whereby to better withstand lateral thrust on the wheel.

In testimony whereof I have signed my name to this specification.

VALENTIN MARTI CABRETOSA.